US010355410B2

(12) United States Patent
Yamanashi et al.

(10) Patent No.: US 10,355,410 B2
(45) Date of Patent: Jul. 16, 2019

(54) CONNECTOR CONNECTION STRUCTURE (71) Applicant: Yazaki Corporation, Tokyo (JP)

(72) Inventors: Daisuke Yamanashi, Shizuoka (JP);
Kenichi Okamoto, Shizuoka (JP);
Yukihiro Takagi, Tokyo (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/005,516

(22) Filed: Jun. 11, 2018

(65) Prior Publication Data
US 2018/0358748 A1    Dec. 13, 2018

(30) Foreign Application Priority Data

Jun. 12, 2017 (JP) .................. 2017-115435

(51) Int. Cl.
H01R 13/631    (2006.01)
H01R 25/00     (2006.01)
H01R 13/502    (2006.01)
H01R 24/62     (2011.01)
H01R 13/52     (2006.01)
B60R 16/023    (2006.01)
(Continued)

(52) U.S. Cl.
CPC ....... H01R 13/6315 (2013.01); H01R 13/502 (2013.01); H01R 24/62 (2013.01); H01R 25/006 (2013.01); B60R 16/023 (2013.01); B60R 16/03 (2013.01); H01R 13/187 (2013.01); H01R 13/521 (2013.01); H01R 13/5202 (2013.01); H01R 13/5219 (2013.01); H01R 13/74 (2013.01); H01R 2105/00 (2013.01); H01R 2201/26 (2013.01)

(58) Field of Classification Search
CPC .................. H01R 12/91; H01R 13/6315
USPC ................................. 439/246–248
See application file for complete search history.

(56) References Cited

U.S. PATENT DOCUMENTS 6,368,130 B1    4/2002  Fukuda
2014/0065850 A1  3/2014  Takamura et al.
2015/0016783 A1* 1/2015  Leigh .............. G02B 6/32
                                              385/88

FOREIGN PATENT DOCUMENTS

DE    100 28 198 A1    4/2001
JP    2015-35260 A      2/2015

OTHER PUBLICATIONS

German Office Action for the related German Patent Application No. 10 2018 209 360.1 dated Feb. 8, 2019.

* cited by examiner

Primary Examiner — Ross N Gushi
(74) Attorney, Agent, or Firm — Kenealy Vaidya LLP (57) ABSTRACT

Provided is a connector connection structure which is configured to directly connect connectors provided to casings of two devices, respectively, to each other, and which can keep sealing property of the connector connection portion. A second terminal is arranged movable with respect to a second casing, thus displacement of a first casing and the second casing with respect to each other can be absorbed by allowing the second terminal to move, thereby allowing the connectors provided respectively to the casings of the two devices to be directly connected to each other. At this time, a connector-side opening of a second housing is closed using a first housing of a first connector as a mating connector, thereby keeping sealing property of the connector connec- (Continued)

tion portion while allowing the connectors provided respectively to the casings of the two devices to be directly connected to each other.

5 Claims, 4 Drawing Sheets

(51) Int. Cl.
*H01R 105/00* (2006.01)
*H01R 13/74* (2006.01)
*H01R 13/187* (2006.01)
*B60R 16/03* (2006.01)

CONNECTOR CONNECTION STRUCTURE

CROSS REFERENCE TO RELATED APPLICATION

The priority application Japanese Patent Application No. 2017-115435 upon which this patent application is based is hereby incorporated by reference.

BACKGROUND

Field of the Invention

The present disclosure relates to a connector connection structure for connecting a first connector provided to a first casing and a second connector provided to a second casing to each other.

Description of the Related Art

Generally, an automobile is mounted with various on-board devices (for example, a motor, an inverter, a gear box and such), and power or signal may be supplied through or transmitted between these on-board devices. Conventionally, as a connection structure for connecting such on-board devices, there has been proposed a connection structure which connects an inverter with a motor (for example, refer to Japan Patent Application Publication 2015-35260). In the connection structure disclosed in Japan Patent Application Publication 2015-35260, the inverter and the motor are connected to each other via a cable.

SUMMARY OF THE INVENTION

However, the above-mentioned conventional connection structure has a drawback that, connection of two on-board devices via the cable requires providing a cable routing space between the on-board devices, causing an increase in a device installation space in the vehicle. Meanwhile, in case of connecting the connectors of the two on-board devices to each other without using the cable, the relative positions of the on-board devices may be displaced, thus there is a need to provide a movable part to the connector to absorb such displacement. In this case, since a terminal of the connector is passed through a penetrating hole of a casing of the on-board device, if the terminal is movable in the through hole, it is difficult to close the penetrating hole by a housing, possibly causing a decrease in the sealing property of the casing at the connector connection portion.

An object of the present invention is to provide a connector connection structure which directly connects connectors provided to casings of two devices, respectively, to each other, and which can keep the sealing property of a connector connection portion.

To achieve the above-mentioned object, the present invention according to a first aspect provides a connector connection structure for connecting a first connector provided to a first casing and a second connector provided to a second casing to each other, wherein, the first connector includes a first terminal passing through a first through hole of the first casing, and a first housing which houses the first terminal and which is to be fixed to the first casing while closing the first through hole, the second connector includes a second terminal passing through a second through hole of the second casing, and a second housing which houses the second terminal such that the second terminal is movable with respect to the second casing and which is to be fixed to the second casing while covering the second through hole, the second housing includes a housing space which is in communication with an internal space of the second casing and in which the second terminal is disposed, and an opening which allows the housing space to communicate with outside, and by connecting the first connector and the second connector to each other, the opening is closed by the first housing.

According to the connector connection structure of the present invention described above, since the second terminal is movable with respect to the casing, the displacement of the first casing and the second casing with respect to each other can be absorbed by allowing the second terminal to move, thereby allowing the connectors to be connected to each other. Consequently, the connectors which are provided to the casings of two devices, respectively, can be directly connected to each other.

Furthermore, since the first through hole is closed by the first housing, the sealing property can be maintained in the first casing. Meanwhile, for the second casing, the internal space and the housing space of the second housing are in communication with each other, and the housing space is in communication with outside via the opening, and, for the second casing provided with the second connector alone, the internal space is in communication with outside. Thus, by connecting the first connector and the second connector to each other, the opening of the second housing is closed by the first housing, thereby keeping the sealing property.

As described above, by allowing the second terminal to move in the second casing and by closing the opening of the second housing using the first housing of the first connector as the mating connector, the connectors provided respectively to the casings of the two devices can be directly connected to each other, and the sealing property of the connector connection portion can be maintained.

DETAILED DESCRIPTION OF EXEMPLARY EMBODIMENT OF THE INVENTION

Figure 1:
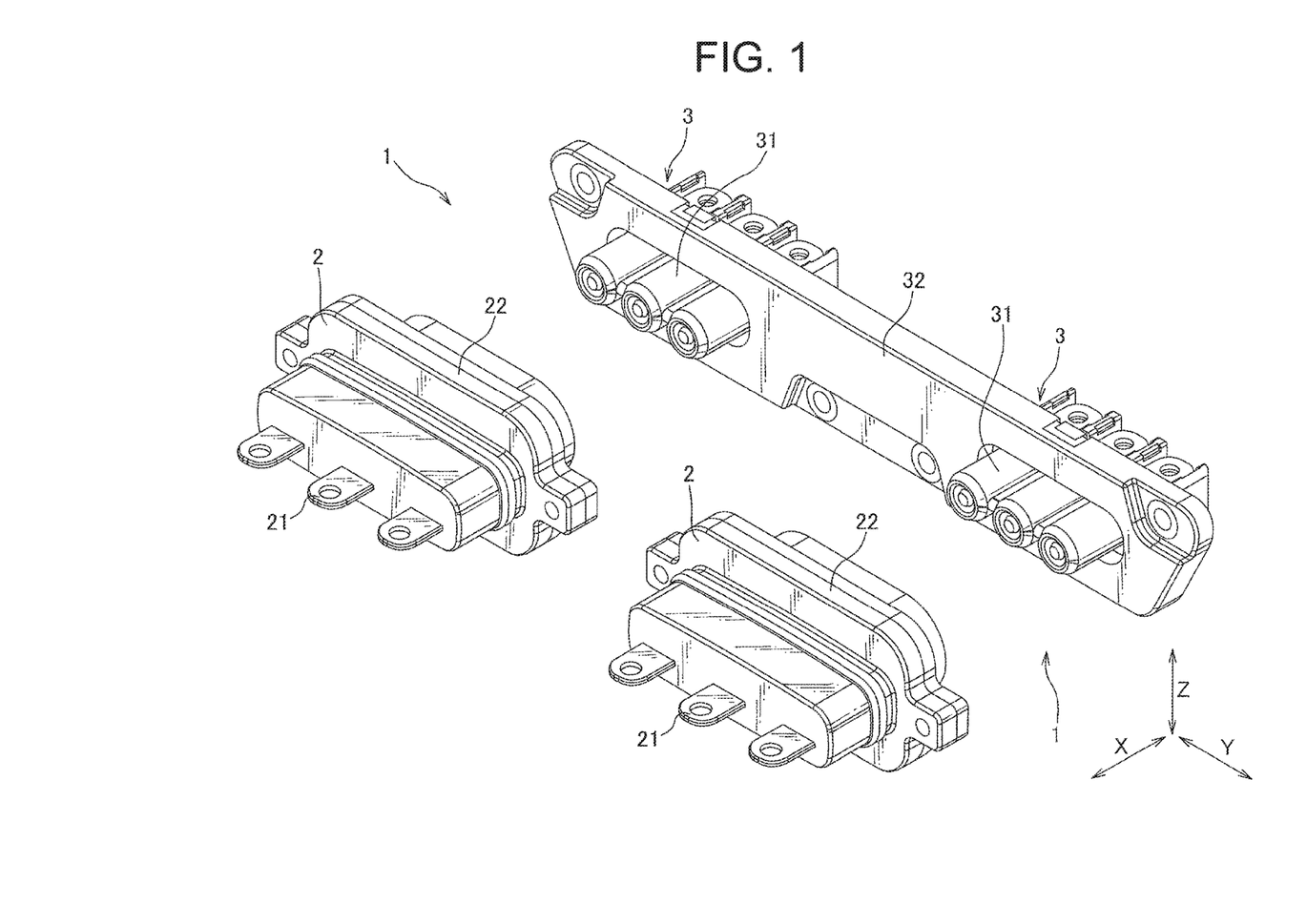
FIG. 1 is a perspective view showing a first connector and a second connector of a connector connection structure according to one embodiment of the present invention.
Figure 2:
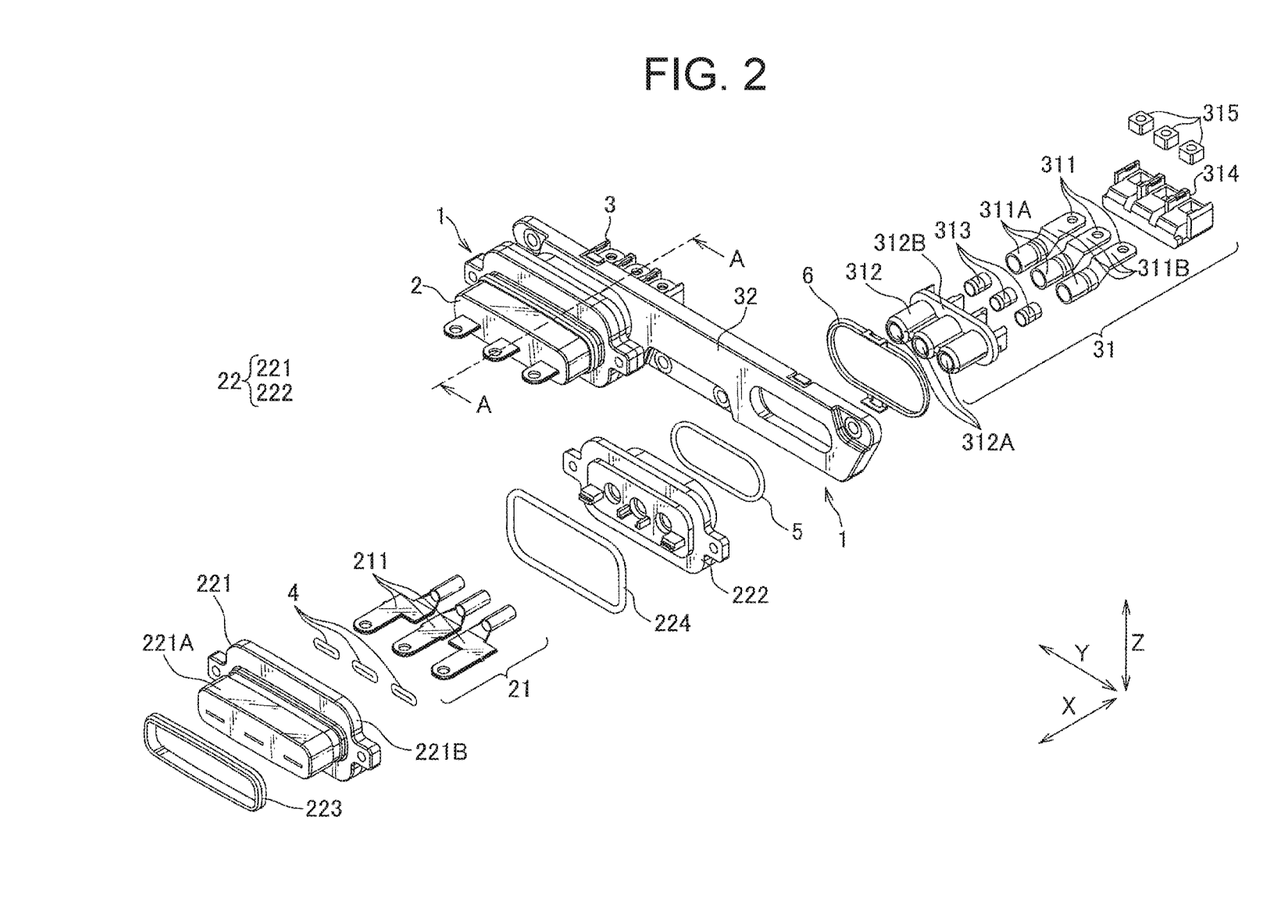
FIG. 2 is an exploded perspective view showing the first connector and the second connector.
Figure 3:
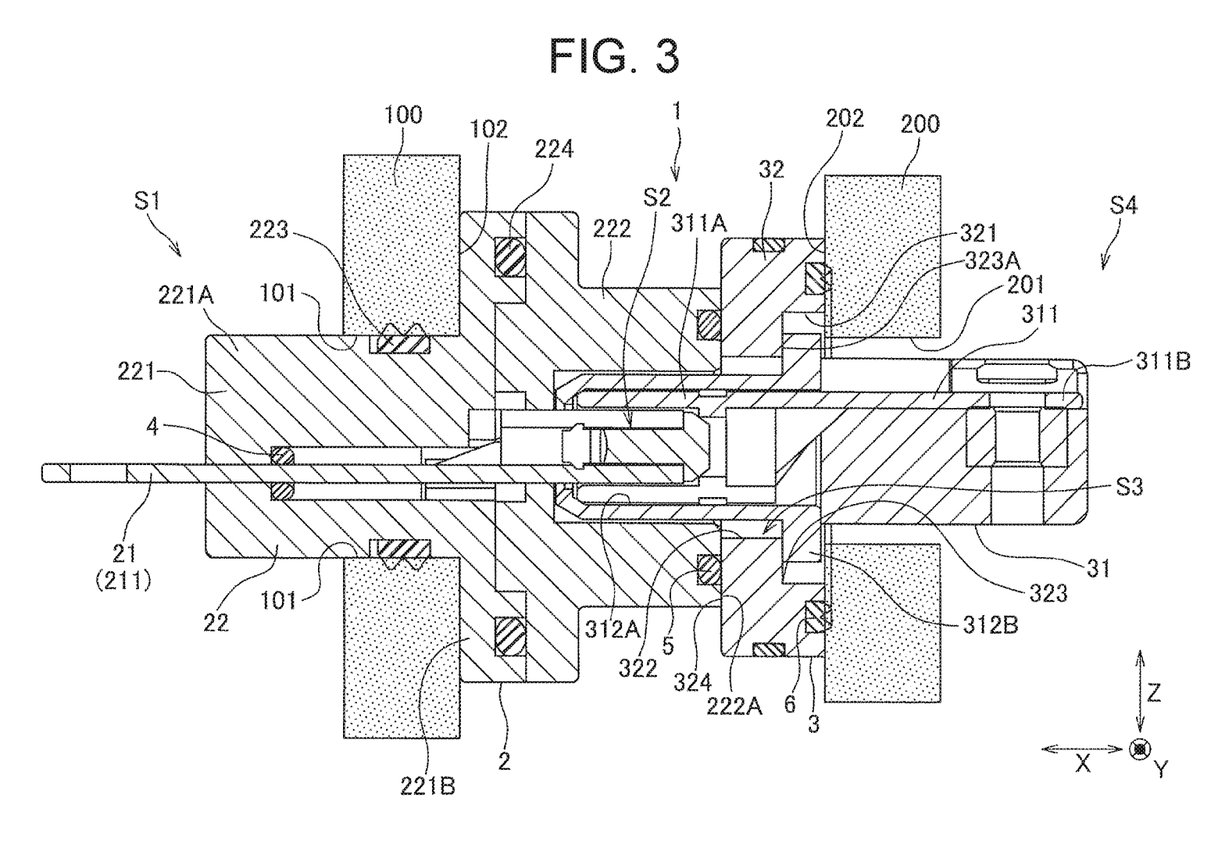
FIG. 3 is a cross sectional view taken along a line A-A shown in FIG. 2.
Figure 4:
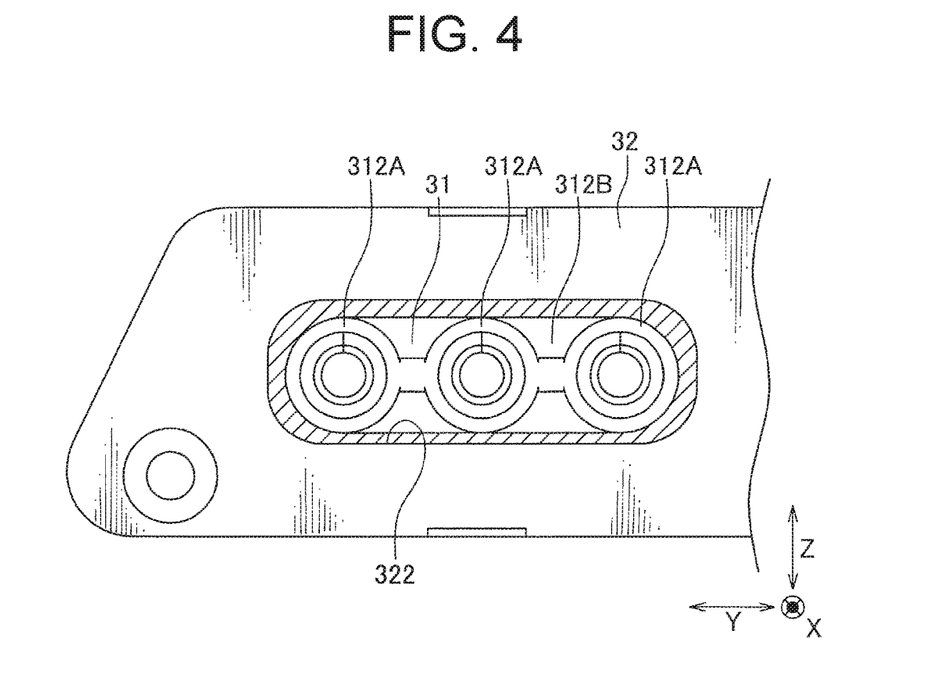
FIG. 4 is a front view showing the second connector.

The following will explain an exemplary embodiment of the present invention in reference to the drawings. FIG. 1 is a perspective view showing a first connector 2 and a second connector 3 of a connector connection structure 1 according to one embodiment of the present invention, FIG. 2 is an exploded perspective view showing the first connector 2 and the second connector 3, FIG. 3 is a cross sectional view taken along a line A-A shown in FIG. 2, and FIG. 4 is a front view showing the second connector 3.

According to the connector connection structure 1 of this embodiment, the first connector 2 provided to a first casing 100 and the second connector 3 provided to a second casing 200 are configured to be connected to each other. In this embodiment, the first casing 100 is a casing which houses a motor body to constitute a motor as an on-board device, and the second casing 200 is a casing which houses an inverter body to constitute an inverter as the on-board device. That is, by connecting the first connector 2 and the second connector 3 to each other, power or signal can be supplied or transmitted between the motor body and the inverter body. In this embodiment, a connection direction of the first connector 2 and the second connector 3 (i.e., a terminal connection direction) is referred to as an X direction, and two directions orthogonal to the X direction are referred to as a Y direction and a Z direction, respectively.

A first through hole 101 for attaching the first connector 2 is formed on the first casing 100, and a second through hole 201 for attaching the second connector 3 is formed on the second casing 200. The through holes 101, 201 are formed into an oval shape with its longitudinal direction corresponding to the Y direction along which the terminals are aligned, as will be described later. As will be explained later, the connector connection is maintained by using a fixation member configured to keep the relative positions of the casings 100, 200 when the connectors are connected to each other.

The first connector 2 includes a first terminal 21 configured to pass through the first through hole 101, and a first housing 22 which houses the first terminal 21 in an immovable manner and which is to be fixed to the first casing 100 while closing the first through hole 101.

The first terminal 21 may be constituted of three terminal fittings 211 aligned along the Y direction. The three terminal fittings 211 may be formed integrally, or may be formed into separate pieces. Each of the three terminal fittings 211 is provided with an O-ring 4.

The first housing 22 is constituted of an insert member 221 configured to be inserted through the first through hole 101 and a protruding member 222 configured to be arranged outside the first casing 100. The insert member 221 and the protruding member 222 are formed by an insulating resin member.

The insert member 221 includes a columnar portion 221A configured to be inserted through the first through hole 101, and a flange portion 221B having a diameter larger than that of the columnar portion 221A and configured to abut on an outer face 102 of the first casing 100. A packing 223 is provided to an outer circumference of the columnar portion 221A, where the packing 223 is configured to abut on an inner circumferential face of the first through hole 101. The insert member 221 houses the first terminal 21 such that the first terminal 21 penetrates through the columnar portion 221A. Since the O-rings 4 are provided to the terminal fittings 211, a first though hole of the columnar portion 221A is closed by the terminal fitting 211 and the O-ring 4.

The first through hole 101 is closed by the above-described columnar portion 221A and the packing 223 inserted into the first through hole 101. As a result, the air tightness of an internal space S1 of the first casing 100 is maintained.

The protruding member 222 is formed into a tubular shape extending along the X direction and having a basal end on the flange portion 221B side. Also, the protruding member 222 is formed so as to house a tip end portion of the first terminal 21. A tip end face of the protruding member 222 corresponds to a first sandwiching face 222A, and an inter-connector packing 5 is provided at a groove formed on the first sandwiching face 222A. Further, a packing 224 is provided between the protruding member 222 and the flange portion 221B, and the insert member 221 and the protruding member 222 are fastened together and fixed to the casing 100, as will be described later. Consequently, one end side of the tubular protruding member 222 is closed by the plate-like flange portion 221B, and the other end side is opened thereby forming a protruding portion space S2.

For first housing 22 described above, the bolt is inserted through the flange portion 221B and the protruding member 222 to fasten them together and fix the first housing 22 to the first casing 100. At this time, the first terminal 21 is not movable with respect to the columnar portion 221A, that is, the first terminal 21 is not movable with respect to the first casing 100.

The second connector 3 includes a second terminal 31 configured to pass through the second through hole 201, and a second housing 32 which movably houses the second terminal 31 and which is to be fixed to the second casing 200. In the shown example, single second housing 32 is used for two second connectors 3; however, one second housing 32 may be used for one second connector 3.

The second terminal 31 includes three terminal fittings 311 aligned along the Y direction, and a housing member 312 housing the three terminal fittings 311. The terminal fitting 311 includes a cylindrical connection portion 311A into which the mating terminal fitting 211 is inserted, and a plate-like connection portion 311B to be connected to an electric wire in the second casing 200. A spring 313 formed of conductive metal is housed inside the cylindrical connection portion 311A to keep the electrical conduction between the terminal fittings 211 and the terminal fittings 311. The plate-like connection portion 311B is held by a nut holder 314, fastened by a bolt and a nut 315 and connected to the electric wire.

The housing member 312 is formed of an insulating resin member, and is provided with three cylindrical chambers 312A housing the cylindrical connection portions 311A of the three terminal fittings 311, respectively, and a coupling portion 312B coupling three chambers 312A. The three chambers 312A are aligned along the Y direction. The coupling portion 312B is formed into a flange shape so as to protrude outward from the outer circumferential faces of the chambers 312A. The respective dimensions in the Y-Z plane of the coupling portion 312B are larger than the opening dimensions of the second through hole 201.

The second housing 32 is formed by an insulating resin member and formed into a plate shape lying along the Y-Z plane, and is opened at both ends in the X direction. The second housing 32 is configured to be attached to the outer face 202 of the second casing 200. A packing 6 is provided between the second housing 32 and the outer face 202.

In the second housing 32, a casing-side opening 321 located on the outer face 202 side has an opening dimension that is larger than that of the second through hole 201, and is arranged so as to surround the second through hole 201. Thus, the second through hole 201 is covered by the second housing 32. In the second housing 32, a connector-side opening 322 located on the first connector 2 side is formed to have an opening dimension smaller than that of the casing-side opening 321. That is, a step portion 323 is formed on an inner circumferential face of the second housing 32. By forming this step portion 323, the second housing 32 is provided with a facing portion 323A separated (distant) from the outer face 202 of the second casing 200 and facing the outer face 202 of the second casing 200. Further, the opening dimension of the connector-side opening 322 is smaller than the dimension in the Y-Z plane of the coupling portion 312B of the second terminal 31, but larger than the dimension in the Y-Z plane of the housing chambers 312A.

A face of the second housing 32 located on the first connector 2 side (i.e., the face on which the connector-side opening 322 is formed) corresponds to a second sandwiching face 324. The second sandwiching face 324 is configured to abut on the first sandwiching face 222A. The inter-connector packing 5 is provided between the first sandwiching face 222A and the second sandwiching face 324. In this embodiment, the inter-connector packing 5 is received in the groove formed on the first sandwiching face 222A; however, the groove may be formed on the second sandwiching face, or no groove may be formed on both sandwiching faces, and in this case the packing may be merely sandwiched between the sandwiching faces, and the first and second sandwiching faces may not abut on each other.

The second terminal 31 is passed through the openings 321, 322 of the second housing 32. The plate-like second housing 32 has a predetermined thickness (the X direction dimension). Inside of the openings 321, 322 corresponds to a housing space S3, where a portion of the second terminal 31 is housed in the housing space S3.

The second housing 32 is fastened to the outer face 202 of the second casing 200 by a bolt, thereby fastened to the second casing 200. On the other hand, the second terminal 31 is not fixed to the second housing 32 or the casing 200.

A portion of the cylindrical connection portion 311A of the second terminal 31 is located in the connector-side opening 322, and the coupling portion 312B is located in the casing-side opening 321. At this time, the respective dimensions in the Y-Z plane of the cylindrical connection portion 311A are smaller than the opening dimension of the connector-side opening 322, and the respective dimensions in the Y-Z plane of the coupling portion 312B are smaller than the opening dimension of the casing-side opening 321. Consequently, the second terminal 31 can freely move in the second housing 32 in the Y direction and in the Z direction. In FIG. 4, the hatched portion indicates a movable range of the second terminal 31.

The X direction dimension of the second housing 32 at the casing-side opening 321 (i.e., a distance between the facing portion 323A and the outer face 202) is larger than the X direction dimension of the coupling portion 312B, allowing the second terminal 31 to be movable in the predetermined range in the X direction. The movement of the second terminal 31 toward inside the second casing 200 is restricted by the coupling portion 312B abutting on the outer face 202, while the movement of the second terminal 31 toward outside the second casing 200 is restricted by the coupling portion 312B abutting on the facing portion 323A. In other words, the coupling portion 312B disposed between the facing portion 323A and the outer face 202 functions as a to-be-restricted portion.

As described above, the second terminal 31 is movable in the second housing 32 in any directions of the X direction, the Y direction and the Z direction. That is, the second terminal 31 is housed in the second housing 32 in a manner movable with respect to the second casing 200. Further, the second terminal 31 can move so as to slant with respect to a direction orthogonal to the outer face 202. As described above, the second terminal 31 is movable with respect to the second casing 200, thus, when trying to connect the first connector 2 and the second connector 3 to each other, if the first casing 100 and the second casing 200 are displaced with respect to each other, the second terminal 31 can move so the displacement is absorbed.

For the second casing 200 to which the second connector 3 is attached, an internal space S4 of the second casing 200 is in communication with the housing space S3 of the second housing 32 via the second through hole 201. In a state where the first connector 2 and the second connector 3 are not connected to each other, the housing space S3 is in communication with outside via the connector-side opening 322. That is, the internal space S4 is in communication with outside via the housing space S3.

When the first connector 2 and the second connector 3 are connected to each other (i.e., the terminal fittings of the first terminal 21 and the second terminal 31 are electrically connected), and the inter-connector packing 5 is sandwiched between the first sandwiching face 222A and the second sandwiching face 324, the connector-side opening 322 is surrounded by the inter connector packing 5, and the connector-side opening 322 is closed by the first housing 22. As a result, the internal space S4 and the housing space S3 become in communication with the protruding portion space S2 in the first housing 22. Further, as described above, the protruding portion space S2 is closed at its one end and opened at its other end, thus, by connecting the connectors to each other, the internal space S4, the housing space S3 and the protruding portion space S2 which are in communication with each other together form a closed space. That is, the internal space S4 of the second casing is partitioned (divided) from outside and from the internal space S1 of the first casing 100, and is sealed.

As described above, for the second casing 200 provided with the second connector 3, the internal space S4 communicates with outside in the state prior to the connection of the connectors. However, once the connectors are connected to each other, the internal space S4 does not communicate with outside with the use of the mating first housing 22, thereby keeping the sealing property of the connector connection portion.

The present embodiment described above has following advantageous effects. That is, since the second terminal 31 is movable with respect to the second casing 200, the positional displacement of the first casing 100 and the second casing 200 with respect to each other can be absorbed by allowing the second terminal 31 to move, thus the connectors provided to the casings of two devices, respectively, can be directly connected to each other. Also, at this time, the connector-side opening 322 of the second housing 32 is closed by using the first housing 22 of the first connector 2 which is the mating connector, thereby keeping the sealing property of the connector connection portion while allowing the connectors provided to the casings of two devices, respectively, to be directly connected to each other Furthermore, since the inter-connector packing 5 is provided between the first sandwiching face 222A of the first housing 22 and the second sandwiching face 324 of the second housing 32, the air tightness between the first housing 22 and the second housing 32 can be improved, thereby further improving the air tightness of the second casing 200.

Furthermore, since the second terminal 31 includes the coupling portion 312B as the to-be-restricted portion, the movement of which toward inside the second casing 200 is restricted by the outer face 202 and the movement of which toward outside the second casing 200 is restricted by the step portion 323, the second terminal 31 can be prevented from moving inside the second casing 200 or falling off outside from the second housing 32.

Furthermore, since the coupling portion 312B as the to-be-restricted portion is provided to the housing member 312, the terminal fittings 311 does not abut on the outer face 202 or on the second housing during the movement of the second terminal 31 being restricted. As a result, collision between the metal member and the resin member as well as the collision between the metal members can be prevented, thereby preventing the damage to the respective portions/components.

The present invention is not limited to the embodiment described above. It should be understood that the present invention may include other constitutions and such which can achieve the object of the present invention and may include the modifications and such as described below.

For example, in the embodiment described above, the inter-connector packing 5 is provided between the first sandwiching face 222A of the first housing 22 and the second sandwiching face 324 of the second housing 32. However, the present invention is not limited to such constitution. For example, at least one of the sandwiching faces may be formed of an elastic member and the air tightness is kept by such sandwiching faces abutting on each other. In this case, the inter-connector packing may be omitted.

Furthermore, in the embodiment described above, the second terminal 31 includes the housing member 312, and the housing member 312 is provided with the coupling portion 312B as the to-be-restricted portion. However, the second terminal may not include the housing member, and in this case, the to-be-restricted portion is provided to the terminal fitting. Furthermore, if the second terminal is unlikely to move, for example due to the electric wire to be connected to the second terminal having high stiffness, then, the to-be-restricted portion may be omitted.

Furthermore, in the embodiment described above, the coupling portion 312B of the second terminal 31 is arranged between the facing portion 323A of the second housing 32 and the outer face 202 of the second casing 200, that is, the second terminal 31 is held by the second housing 32 and the casing 200. However, the second terminal can be held only by the second housing.

The preferred constitution and method for implementing the present invention have been disclosed herein, however the present invention is not limited to these. That is, although the present invention is shown and explained with reference to some particular embodiment, a skilled person in the art will understand that various modifications related to shape, material, number and other detailed constitution may be applied to the embodiments described herein without departing from the range of technical idea and the object of the present invention. Therefore, since those descriptions specifying the shape, material and such disclosed herein are described by way of examples to facilitate the understanding of the present invention and do not limit the present invention, the descriptions of members using names without a part or entire of such limitations of shape, material and such are within the present invention.

LIST OF REFERENCE SIGNS 1 connector connection structure
2 first connector
21 first terminal
22 first housing
222A first sandwiching face
3 second connector
31 second terminal
311 terminal fitting
312 housing member
312B coupling portion
32 second housing
322 connector-side opening
323A facing portion
324 second sandwiching face
5 inter-connector packing
100 first casing
101 first through hole
200 second casing
201 second through hole
202 outer face
S3 housing space

What is claimed is:

1. A connector connection structure comprising:
a first casing including a first through hole;
a first connector provided to the first casing;
a second casing including a second through hole; and
a second connector provided to a the second casing, wherein,
the first connector includes a first terminal passing through the first through hole of the first casing, and a first housing which houses the first terminal and which is fixed to the first casing while closing the first through hole,
the second connector includes a second terminal passing through the second through hole of the second casing, and a second housing which houses the second terminal such that the second terminal is movable with respect to the second casing and which is fixed to the second casing while covering the second through hole,
the second housing includes a housing space which is in communication with an internal space of the second casing and in which the second terminal is disposed, and an opening which allows the housing space to communicate with outside,
by connecting the first connector and the second connector to each other, the opening is closed by the first housing,
the second housing includes a second sandwiching face on which the opening is formed,
the first housing includes a first sandwiching face facing the second sandwiching face, and
a packing is provided between the first sandwiching face and the second sandwiching face so as to surround the opening.

2. The connector connection structure according to claim 1, wherein
the second housing includes a facing portion arranged distant from an outer face of the second casing and facing the outer face, and
the second terminal includes a to-be-restricted portion disposed between the facing portion and the outer face.

3. The connector connection structure according to claim 2, wherein
the second terminal includes a terminal fitting and a housing member housing the terminal fitting, and
the to-be-restricted portion is provided to the housing member.

4. A connector connection structure comprising:
a first casing including a first through hole;
a first connector provided to the first casing;
a second casing including a second through hole; and
a second connector provided to a the second casing, wherein,
the first connector includes a first terminal passing through the first through hole of the first casing, and a first housing which houses the first terminal and which is fixed to the first casing while closing the first through hole,
the second connector includes a second terminal passing through the second through hole of the second casing, and a second housing which houses the second terminal such that the second terminal is movable with respect to the second casing and which is fixed to the second casing while covering the second through hole,
the second housing includes a housing space which is in communication with an internal space of the second casing and in which the second terminal is disposed, and an opening which allows the housing space to communicate with outside, by connecting the first connector and the second connector to each other, the opening is closed by the first housing, the second housing includes a facing portion arranged distant from an outer face of the second casing and facing the outer face, and the second terminal includes a to-be-restricted portion disposed between the facing portion and the outer face.

5. The connector connection structure according to claim 4, wherein the second terminal includes a terminal fitting and a housing member housing the terminal fitting, and the to-be-restricted portion is provided to the housing member.

\* \* \* \* \*